(12) United States Patent
Takaki et al.

(10) Patent No.: US 7,877,764 B2
(45) Date of Patent: Jan. 25, 2011

(54) CHUCKING MECHANISM, MOTOR HAVING THE SAME, AND METHOD OF MANUFACTURING THE SAME

(75) Inventors: Hitoshi Takaki, Kyoto (JP); Yusuke Iwai, Kyoto (JP)

(73) Assignee: Nidec Corporation, Kyoto (JP)

( * ) Notice: Subject to any disclaimer, the term of this patent is extended or adjusted under 35 U.S.C. 154(b) by 880 days.

(21) Appl. No.: 11/819,559

(22) Filed: Jun. 28, 2007

(65) Prior Publication Data
US 2008/0002288 A1    Jan. 3, 2008

(30) Foreign Application Priority Data
Jun. 29, 2006   (JP)   ............... 2006-179349

(51) Int. Cl.
G11B 17/028   (2006.01)
G11B 19/20    (2006.01)

(52) U.S. Cl. ................... 720/707; 310/67 R
(58) Field of Classification Search ........... 720/707, 720/706; 310/67 R, 261–262, 156.01, 156.12–156.14
See application file for complete search history.

(56) References Cited

U.S. PATENT DOCUMENTS

| | | | |
|---|---|---|---|
| 5,323,379 A | | 6/1994 | Kim |
| 5,426,548 A | | 6/1995 | Fujii et al. |
| 5,623,382 A | * | 4/1997 | Moritan et al. ........... 360/99.08 |
| 5,774,445 A | * | 6/1998 | Sawi et al. .................. 720/707 |
| 5,799,006 A | | 8/1998 | Mukawa |
| 6,041,033 A | | 3/2000 | Otsubo et al. |
| 6,208,613 B1 | * | 3/2001 | Iizuka ........................ 720/707 |
| 6,222,818 B1 | * | 4/2001 | Kobayashi et al. .......... 720/707 |
| 6,363,048 B1 | * | 3/2002 | Wu et al. .................... 720/707 |
| 6,756,711 B2 | | 6/2004 | Matsuyama et al. |
| 6,757,238 B2 | | 6/2004 | Higuchi |
| 6,826,771 B1 | * | 11/2004 | Wada ......................... 720/707 |

(Continued)

FOREIGN PATENT DOCUMENTS

CN    1412758 A    4/2003

(Continued)

OTHER PUBLICATIONS

Chinese Office Action dated Aug. 21, 2009, issued in Chinese Patent Application No. 200810087511.6.

*Primary Examiner*—Brian E Miller
(74) *Attorney, Agent, or Firm*—Westerman, Hattori, Daniels & Adrian, LLP

(57) ABSTRACT

A turn table of a motor includes a first cylindrical portion extending in an axial direction, a first discoid portion radially outwardly extending from the first cylindrical portion, and a second discoid portion radially outwardly extending from the second cylindrical portion. A chucking member arranged on the turn table includes a main body having a diameter substantially the same as that of a center opening of a data storage disk to be arranged on the motor. The chucking member also includes a plurality of chucking claws having radially tip ends arranged radially outside of the outer circumferential surface of the main body and a plurality of coil springs applying bias force pressing the chucking claws in the radially outer direction. A radially inner end of each of the coil springs comes in contact with and is supported by at least one of the radially inner wall of the main body and the second cylindrical portion of the turn table.

41 Claims, 8 Drawing Sheets

U.S. PATENT DOCUMENTS

| | | | |
|---|---|---|---|
| 6,832,384 B2 | 12/2004 | Yamaguchi | |
| 6,868,549 B2 * | 3/2005 | Watanabe et al. | 720/715 |
| 6,871,352 B2 | 3/2005 | Kurosaka et al. | |
| 6,957,443 B2 | 10/2005 | Horng et al. | |
| 7,360,227 B2 | 4/2008 | Iwai | |
| 7,493,633 B2 | 2/2009 | Ikemoto | |
| 7,538,459 B2 * | 5/2009 | Ichizaki | 310/67 R |
| 7,540,005 B2 * | 5/2009 | Toyokawa et al. | 720/709 |
| 7,581,235 B2 * | 8/2009 | Oota | 720/707 |
| 2002/0079758 A1 | 6/2002 | Matsuyama et al. | |
| 2003/0107984 A1 | 6/2003 | Yamaguchi | |
| 2004/0256926 A1 * | 12/2004 | Miyamoto | 310/68 B |
| 2006/0048176 A1 * | 3/2006 | Choi et al. | 720/707 |
| 2007/0157219 A1 | 7/2007 | Oota | |
| 2007/0192779 A1 | 8/2007 | Oota | |
| 2007/0192780 A1 | 8/2007 | Oota | |
| 2007/0199008 A1 | 8/2007 | Oota | |
| 2007/0278880 A1 | 12/2007 | Wada et al. | |
| 2007/0300247 A1 * | 12/2007 | Kim et al. | 720/707 |
| 2008/0235717 A1 | 9/2008 | Takaki et al. | |
| 2008/0235718 A1 | 9/2008 | Takaki et al. | |
| 2008/0235720 A1 | 9/2008 | Takaki et al. | |
| 2009/0241140 A1 | 9/2009 | Takaki et al. | |

FOREIGN PATENT DOCUMENTS

| | | |
|---|---|---|
| JP | 10-80119 A | 3/1998 |
| JP | 11-55900 A | 2/1999 |
| JP | 11-73722 A | 3/1999 |
| JP | 11-262214 A | 9/1999 |
| JP | 2000-166170 A | 6/2000 |
| JP | 2001-286113 A | 10/2001 |
| JP | 2001-339896 A | 12/2001 |
| JP | 2002-176742 A | 6/2002 |
| JP | 2002-190149 A | 7/2002 |
| JP | 2003-45105 A | 2/2003 |
| JP | 2005-253239 A | 9/2005 |
| JP | 2005251298 A | 9/2005 |
| JP | 2005251299 A | 9/2005 |
| JP | 2005251300 A | 9/2005 |
| JP | 2005251301 A | 9/2005 |
| JP | 2005251302 A | 9/2005 |
| JP | 2005251303 A | 9/2005 |
| JP | 2005251304 A | 9/2005 |
| JP | 2005251305 A | 9/2005 |
| JP | 2005251306 A | 9/2005 |
| JP | 2005-354757 A | 12/2005 |
| JP | 2006-48821 A | 2/2006 |
| JP | 2008-010071 A | 1/2008 |
| KR | 10-20050095085 A | 9/2005 |

\* cited by examiner

CHUCKING MECHANISM, MOTOR HAVING THE SAME, AND METHOD OF MANUFACTURING THE SAME

BACKGROUND OF THE INVENTION

1. Field of the Invention

The present invention generally relates to chucking mechanism for detachably retaining thereon a data storage disk having a center opening (e.g., CDs and DVDs), motors having the chucking mechanism, and a method of manufacturing the chucking mechanism.

2. Background of the Related Art

To a CD/DVD drive used for a personal computer (e.g., a laptop computer), a chucking mechanism detachably retaining a data storage disk having a center opening and a motor using thereof are adapted. Recently, reducing thickness of the laptop computer is called for, and it is demanded that the thickness of the CD/DVD drive used for laptop computers be reduced. Consequently, it is demanded that the thickness of the chucking mechanism and the motor having the same be reduced.

In general, the motor having the chucking mechanism includes a turn table being rotatable about a center axis and having a disk-placing surface on which the data storage disk is arranged, a chucking member arranged coaxial with the turn table and fitted into a center opening of the data storage disk to retain the data storage disk, and a bearing mechanism rotatably supporting the turn table. A chucking mechanism is generally defined by the turn table and the chucking member.

Conventionally, reducing the thickness of the motor having the chucking mechanism (i.e., an axial height of the motor) has been achieved by reducing axial lengths of components constituting the motor. However, it has been difficult to adapt the technique to further reduce the axial lengths of the motor.

For example, reducing the axial height of the bearing mechanism will result in degrading the rotational stability of the turn table. When an oil retaining bearing is used as the bearing mechanism of the motor, reducing the axial height of the bearing mechanism will result in reducing an amount of the oil reserved therein, shortening the bearing life of the motor. Thus, in order to maintain a preferable motor property, the axial height of the bearing mechanism should be preferably maintained.

As described above, it is generally difficult to reduce the axial height of the motor while maintaining a property of the motor.

BRIEF SUMMARY OF THE INVENTION

In order to overcome the problems described above, preferred embodiments of the present invention provide a chucking mechanism detachably supporting a data storage disk having a discoid shape with a center opening.

The chucking mechanism according to preferred embodiments of the present invention includes a turn table and a chucking member. The turn table includes a first cylindrical portion radially extending, a first discoid portion radially outwardly extending from the first cylindrical portion, a second cylindrical portion axially downwardly extending from a radially outside end of the first discoid portion, and a second discoid portion radially outwardly extending from the second cylindrical portion, on which the data storage disk is arranged. In the first cylindrical portion, a shaft of the motor to which the chucking mechanism is arranged is to be inserted.

The chucking member is arranged on the turn table in a manner coaxial with the center axis. The chucking member includes a main body having an inner circumferential surface defining a center bore in which a first cylindrical portion of the turn table is fitted, an outer circumferential surface which is to radially face a radially inner surface of the data storage disk defining the center opening, and a radially inner wall arranged radially between an inner circumferential surface and the outer circumferential surface, a plurality of chucking claws supported in the main body in a radially movable manner, having radial tip ends arranged radially outside of the outer circumferential surface of the main body, and a plurality of elastic members arranged radially between the radially inner wall of the main body and the plurality of chucking claws, applying bias force pressing the chucking claws in the radially outer direction.

Each of the elastic member comes in contact with at least one of the radially inner wall and the second cylindrical portion, and the radially inner wall and the second cylindrical portion are arranged at positions close or substantially the same to each other in a radial direction.

According to preferred embodiments of the present invention, a motor including a turn table to which a shaft is fixed is provided. The turn table includes a first cylindrical portion extending in an axial direction, a first discoid portion radially outwardly extending from the first cylindrical portion, a second cylindrical portion axially downwardly extending from a radially outside end of the first discoid portion, and a second discoid portion radially outwardly extending from the second cylindrical portion, on which the data storage disk is arranged. The motor further includes a rotor magnet attached to the turn table, a stator facing the rotor magnet via a gap defined therebetween, a sleeve having a substantially cylindrical shape and supporting the shaft in a rotatable manner, and a housing having a substantially cylindrical shape in which the sleeve is arranged. A diameter of the second cylindrical portion is greater than that of the housing at radially outside of the housing.

According to preferred embodiments of the present invention, the housing includes a flange portion radially outwardly extending from an axially upper end of the housing, and a retaining plate arranged on an axially lower surface of the second discoid portion of the turn table. The retaining plate includes an extending portion arranged axially lower than the flange portion and having a radially inner end arranged radially inner from a radially outer end of the flange portion. Through the configuration, when a force removing the rotor and the shaft into the axially upper direction is applied, the extending portion of the retaining plate engages with the flange portion, preventing the turn table and the shaft from axially upwardly removed from the sleeve.

According to preferred embodiments of the present invention, a method of manufacturing a chucking mechanism is provided. In the method, the chucking mechanism includes a turn table rotatable about a center axis and a chucking member. The turn table includes a first cylindrical portion axially extending, a first discoid portion radially outwardly extending from the first cylindrical portion, a second cylindrical portion axially downwardly extending from a radially outside end of the first discoid portion, a second discoid portion radially outwardly extending from the second cylindrical portion, on which the data storage disk is arranged, and a plurality of through holes axially penetrating the second discoid portion. The chucking member is arranged on the turn table in a manner coaxial with the center axis. The chucking member includes a main body having an inner circumferential surface defining a center bore in which a first cylindrical portion of } the turn table is fitted, an outer circumferential surface which is to radially face an radially inner surface of the data storage disk defining the center opening, and a radially inner wall arranged radially between the radially inner surface and the outer circumferential surface. The chucking member also includes a plurality of chucking claws arranged to the main body in a radially movable manner, having radial tip ends arranged radially outside of the outer circumferential surface of the main body, and a plurality of coil springs arranged radially between the radially inner surface and the plurality of chucking claws and applying bias force pressing the chucking claws in the radially outer direction. In the chucking mechanism, the through holes are arranged axially below the coil springs.

The method includes steps of attaching a plurality of the chucking claws to the main body of the chucking member, fixing the main body to which the chucking claws is attached to the turn table, and arranging a plurality of coil springs between the main body and the plurality of chucking claws via the through holes arranged in the turn table.

Other features, elements, steps, processes, characteristics and advantages of the present invention will become more apparent from the following detailed description of preferred embodiments of the present invention with reference to the attached drawings.

DETAILED DESCRIPTION OF THE INVENTION

Figure 1:
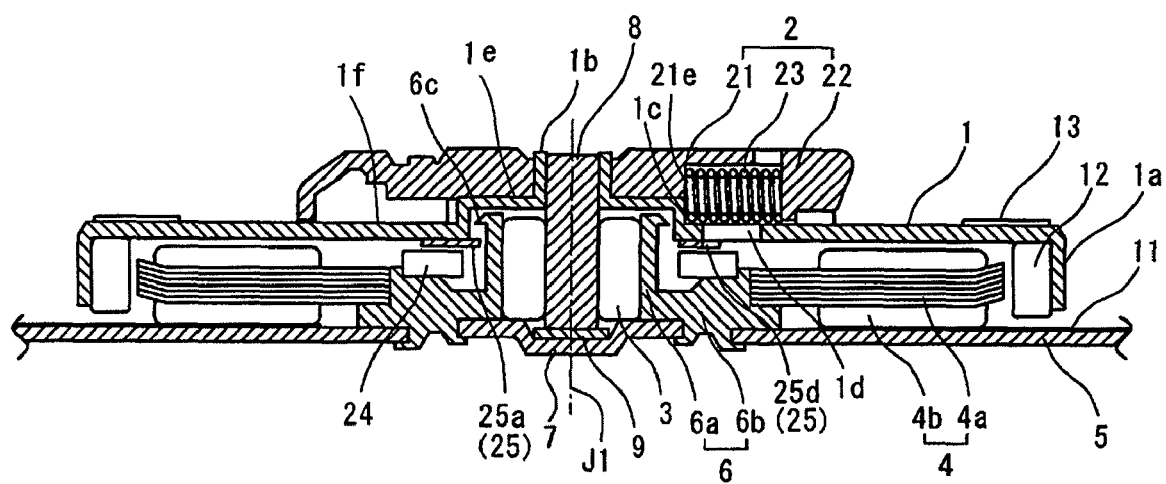
FIG. 1 illustrates a cross section of a motor along a center axis thereof according to a preferred embodiment of the present invention.

In the description of the preferred embodiments of the present invention, words such as upper, lower, left, right, upward, downward, top, bottom and the like for describing positional relationships between respective members and directions merely indicate positional relationships and directions in FIG. 1. Such words do not indicate positional relationships and directions of the members mounted in an actual device or in drawings other than FIG. 1. Furthermore, for convenience's sake in the description, orientation parallel to a rotational center axis of a motor is expressed as "axially" and perpendicular to the rotational center axis of the motor is expressed as "radially." In the detail description of each element of the motor, the words such as axially and radially are used for describing a positional relationship between the members as illustrated in FIG. 1.

General Structure of Motor

Figure 2A:
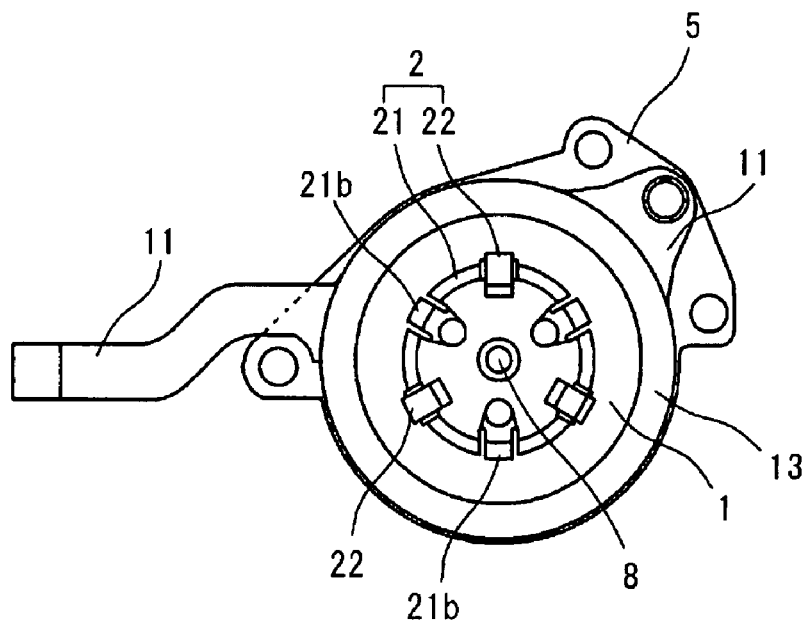
FIG. 2A is a top plan view illustrating the motor.
Figure 2B:
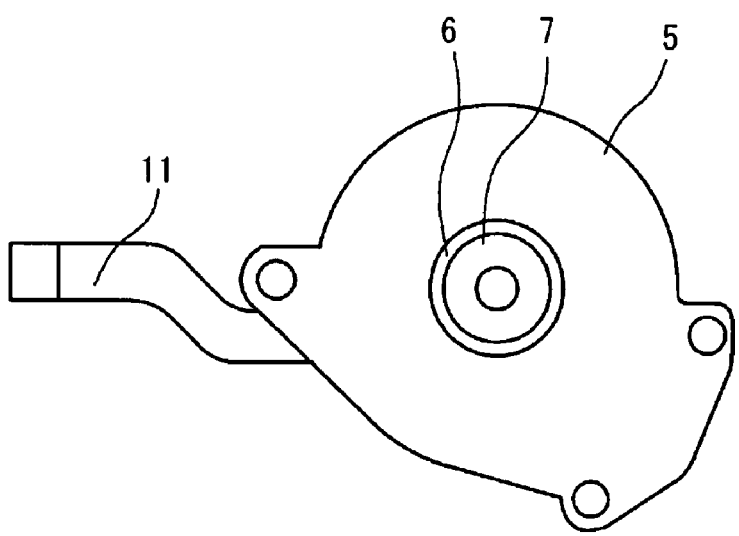
FIG. 2B is a bottom plan view illustrating the motor.
Figure 3A:
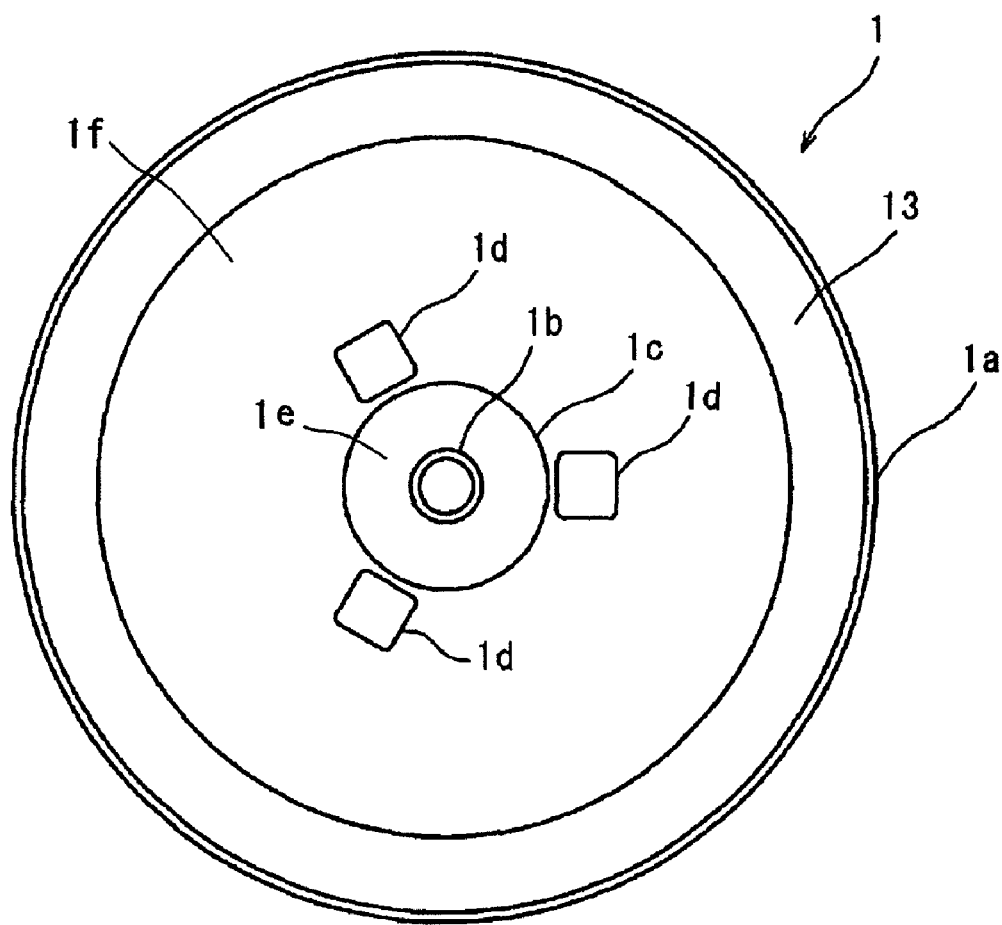
FIG. 3A is a top plan view of a turn table according to a preferred embodiment of the present invention.
Figure 3B:
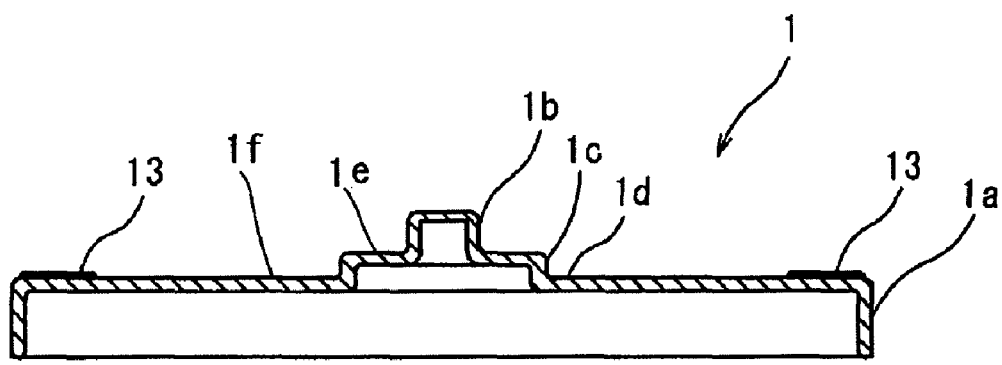
FIG. 3B illustrates a cross section of the turn table along the center axis.

With reference to FIGS. 1, 2A, 2B, 3A, and 3B, a general structure of a motor according to a preferred embodiment of the present invention will be described. FIG. 1 illustrates a cross section of the motor along a center axis J1. FIG. 2A is a top plan view illustrating the motor. FIG. 2B is a bottom plan view illustrating the motor. FIG. 3A is a top plan view of a turn table according to the preferred embodiment of the present invention. FIG. 3B illustrates a cross section of the turn table along the center axis.

As illustrated in FIGS. 1, 2A, 2B, 3A, and 3B, the motor includes a turn table 1, a chucking member 2, a sleeve 3, and a stator 4. The turn table 1 is rotatable around the center axis J1 and has a disk-supporting surface at which a portion of a data storage disk (not illustrated in drawings) near a center opening thereof is placed. The chucking member 2 is arranged on an axially upside of the turn table 1 in a manner centering on a center axis J1 and is fitted in the center opening of the data storage disk defined by a radially inner surface for retaining the data storage disk on the turn table 1. The sleeve 3 defines a part of a bearing mechanism rotatably supporting a shaft 8 fixed with the turn table 1. The stator 4 generates torque centered on the center axis J1 and rotating the turn table 1. Hereinafter, the chucking member 2 and the turn table 1 together are referred to as a chucking mechanism.

As illustrated in FIG. 1, the motor further includes a plate member 5 having an opening centered on the center axis J1. The plate member 5 is arranged to the motor as a base of the motor and is made of stainless steel. The motor also includes a bushing 6 made of copper alloy. The bushing 6 is fitted into the opening of the plate member 5 and fixed thereto by crimping. The busing 6 is defined by a cylindrical portion 6a extending into the axial direction and a base portion 6b radially outwardly extending from a lower portion of the cylindrical portion 6a. A portion of a lower surface of the base portion 6b is arranged on a radially inner portion the plate member 5. The cylindrical portion 6a includes an upper opening and a lower opening, and the lower opening thereof is closed by a cap 7 made of a metallic material. The cap 7 is fixed to the bushing 6 by crimping.

The sleeve 3 is arranged at a radially inside of the cylindrical portion 6a of the bushing 6. The sleeve 3 is made of a sintered metallic material, and is impregnated with lubricating oil. The sleeve 3 has a substantially cylindrical shape having a radial thickness being substantially constant across an entire axial section thereof. Edge portions of the sleeve 3 (e.g., a radially inner portions and a radially outer portions of axially upper and lower surfaces of the sleeve 3) are preferably chamfered.

The axially upper surface of the sleeve 3 is arranged at axially lower from an axially upper end of the cylindrical portion 6a. Through the configuration, when the lubricating oil steeps from the axially upper end surface of the sleeve 3, the cylindrical portion 6a prevents the steeped lubricating oil from leaking to radially outside of the sleeve 3. Thus, it is possible to prevent the bearing life from being shortened due to the lubricant oil leakage.

The shaft 8 is fixed with the turn table 1 in a manner centered on the center axis J1 and is inserted in the sleeve 3. In addition, a thrust plate 9 (e.g., a circular plate made of fluoroplastic) is arranged on an upper surface of the cap 7 to rotatably support a lower end portion of the shaft 8.

The stator is arranged at a radially outside portion of the base portion 6b of the bushing 6. The stator 4 includes a stator core 4a formed by laminating as plurality of silicon steel plates and a coil 4b formed by winding a wire around a portion of the stator core 4a via an insulator (not illustrated in drawings). The base portion 6b includes a stair portion at a radially outer part thereof, and the stair portion is fitted into a center opening of the stator 4 such that a radially inner surface and a part of the axially lower surface of the stator core 4a are abutted against the stair portion. The motor also includes a flexible circuit board 11 attached to an upper surface of the plate member 5 by adhesive. The wire defining the coil 4b is connected to a conductive pattern of the flexible circuit board 11. In other words, the coil 4b is connected to an external device via the conductive pattern of the flexible circuit board 11.

An annular magnet 24 is arranged on an upper surface of the base portion 6b of the bushing 6. An axially upper surface of the annular magnet 24 faces a lower surface of the turn table 1. In the preferred embodiment of the present invention, the turn table 1 is made of a magnetic material, thus the turn table 1 is axially downwardly attracted by the annular magnet 24.

The motor includes a rotor magnet 12 arranged to the turn table 1 in a manner radially facing to the stator 4 via a gap defined therebetween.

Structure of Turn Table

With reference to FIGS. 3A and 3B, a structure of the turn table 1 according to the preferred embodiment of the present invention will be described in detail. FIG. 3A is a top plan view illustrating the turn table 1, and FIG. 3B illustrates a cross section of the turn table 1 along the center axis J1.

The turn table 1 includes a first cylindrical portion 1b in which the shaft 8 is fitted, a first discoid portion radially outwardly extending from a lower end portion of the first cylindrical portion 1b, a second cylindrical portion 1c axially downwardly extending from radially outside end of the first discoid portion, a second discoid portion radially outwardly extending from a lower end of the second cylindrical portion 1c, and a third cylindrical portion 1a connected with the second discoid portion at an upper end thereof and having a radially inner surface to which the rotor magnet 12 is attached. The second discoid portion of the turn table 1 includes three through holes 1d axially penetrating the second discoid portion and spaced about the center axis J1 at approximately 120-degree angles.

Structure of Chucking Mechanism

Figure 4A:
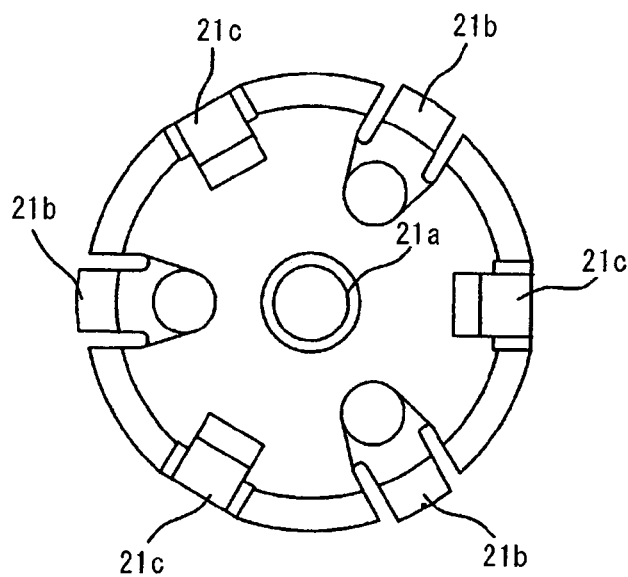
FIG. 4A is a top plan view illustrating a main body of a chucking member according to a preferred embodiment of the present invention.
Figure 4B:
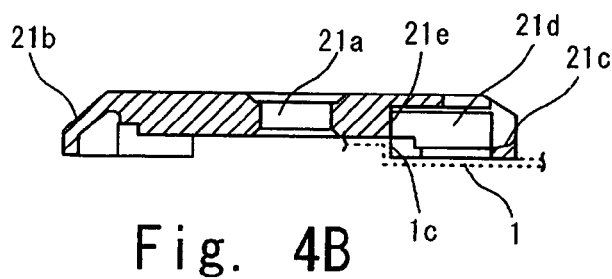
FIG. 4B illustrates a cross section of the main body of the chucking member along the center axis of the motor.
Figure 4C:
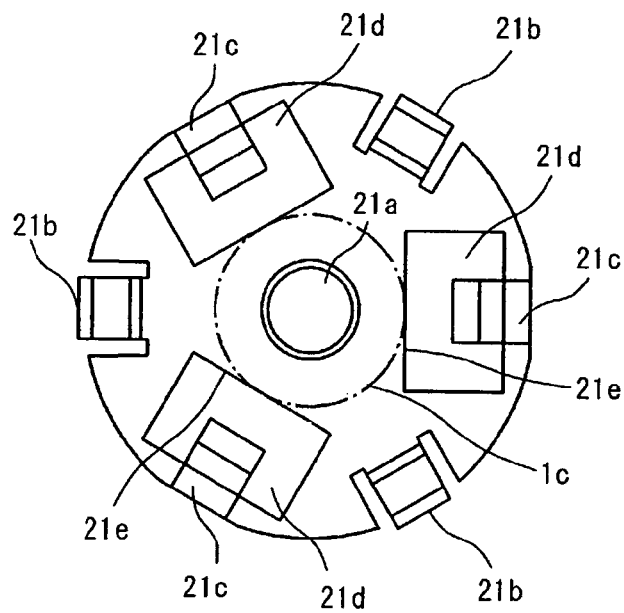
FIG. 4C is a bottom plan view of the main body of the chucking member.
Figure 5A:
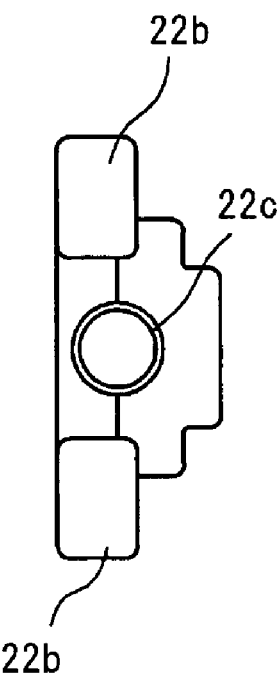
FIG. 5A is a side plan view illustrating a chucking claw of the chucking member.
Figure 5B:
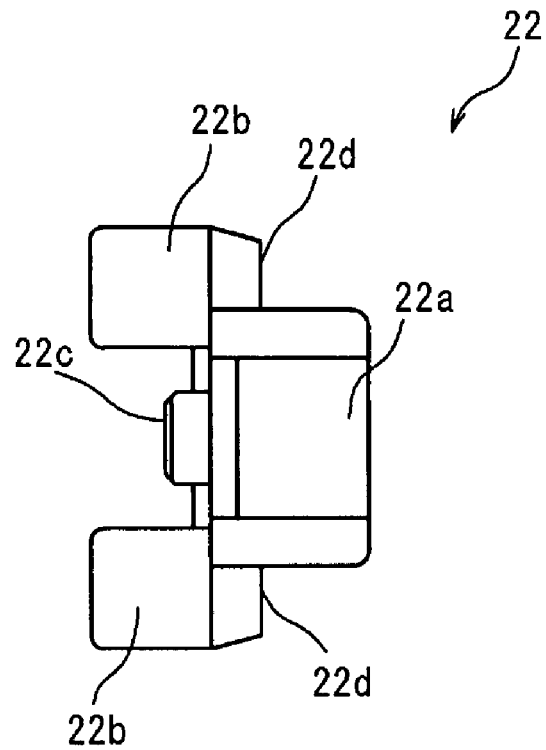
FIG. 5B is a top plan view illustrating the chucking claw of the chucking member.
Figure 5C:
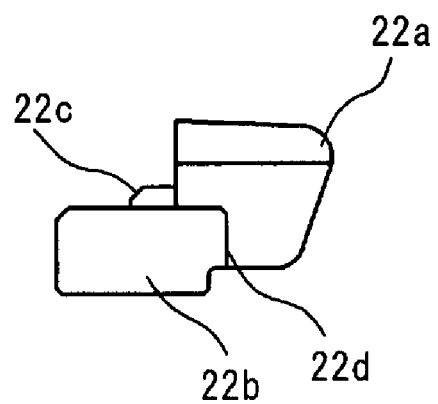
FIG. 5C illustrates a cross section of the chucking claw along the center axis of the motor.
Figure 6:
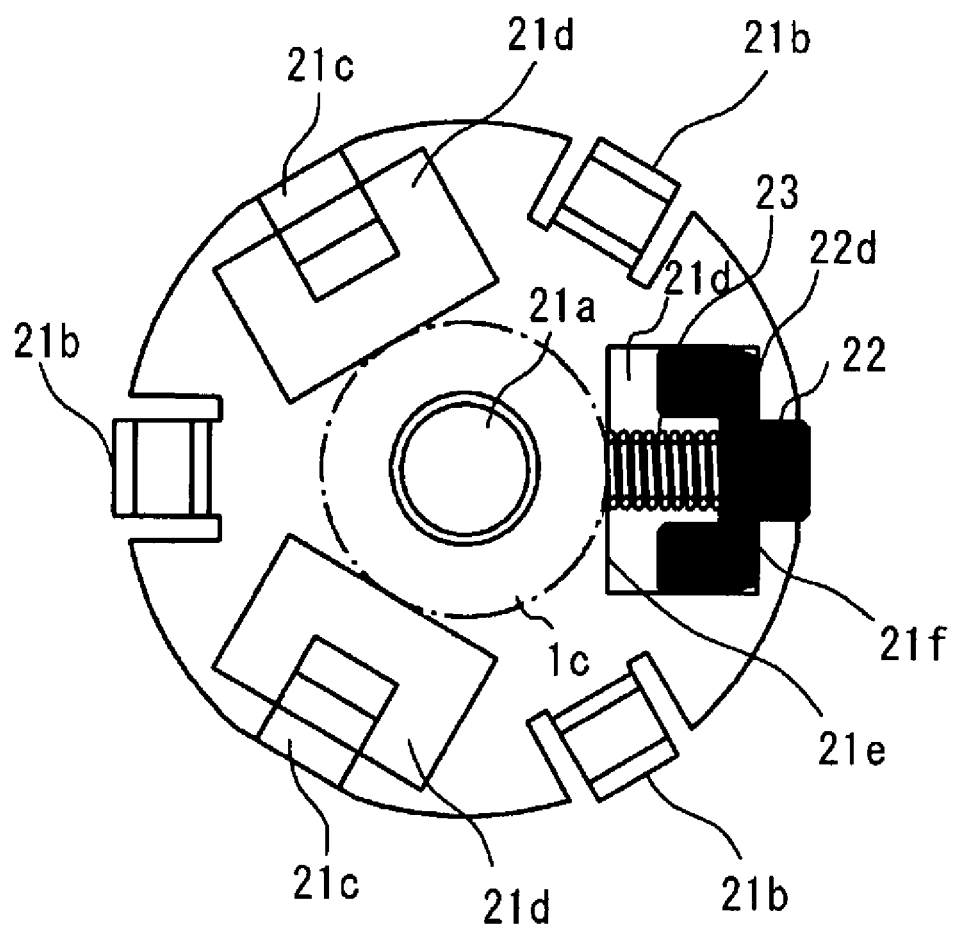
FIG. 6 is a bottom plan view illustrating the chucking member during an assembling process thereof.

With reference to FIGS. 1, and 4 through 6, the chucking mechanism according to the preferred embodiment of the present invention will be described in detail. FIG. 4A is a top plan view illustrating a main body 21 of the chucking member 2 according to the preferred embodiment of the present invention. FIG. 4B illustrates a cross section of the main body 21 of the chucking member 2 along the center axis J1. FIG. 4C is a bottom plan view of the main body 21 of the chucking member 2. FIG. 5A illustrates a chucking claw 22 of the chucking member 2 when it is viewed in the radial direction from a center axis J1. FIG. 5B is a top plan view illustrating the chucking claw 22 of the chucking member 2. FIG. 5C illustrates a cross section of the chucking claw 22 along the center axis J1. FIG. 6 is a bottom plan view illustrating the chucking member 2 during an assembling process thereof. For convenience's sake of illustration, one out of three chucking claws 22 and one out of three coil springs 23 are arranged in one out of three concave portions 21d of the main body 21 in FIG. 6.

As illustrated in FIG. 1, the first cylindrical portion 1b of the turn table 1 is fitted into a center bore 21a (see FIG. 4) of the chucking member 2, which is defined by an inner circumferential surface of the main body 21 of the chucking member 2. In other words, the chucking member 2 is arranged radially outside of the first cylindrical portion 1b of the turn table 1. As described above, the chucking member 2 is arranged on the turn table 1. An annular rubber sheet 13 is arranged at a radially outside portion of the upper surface of the turn table 1. The annular rubber sheet 13 is attached to the axially upper surface of a radially outer part of second discoid portion of the turn table 1 with an adhesive. In the present preferred embodiment of the present invention, a disk-placing surface is defined by the upper surface of the second discoid portion of the turn table 1 and the annular rubber sheet 13 arranged thereon.

The chucking member 2 includes the main body 21, three of chucking claws 22, and the coil springs 23. The main body 21 includes the center bore 21a in which the first cylindrical portion 1b of the turn table 1 is fitted, and has an outer diameter substantially the same as a diameter of the center opening of the data storage disk (not illustrated in drawings). Each of the chucking claws 22 is radially outwardly protruding from a radially outer circumferential surface of the main body 21. Each of the coil springs 23 is arranged so as to radially outwardly bias the corresponding chucking claws 22. The main body 21 and the chucking claws 22 are molded resin products. The chucking claws 22 are arranged in a manner movable in the radial direction.

As illustrated in FIG. 4A, the main body 21 has a substantially discoid shape and is the molded resin product. The main body 21 includes the center bore 21a arranged at substantially the center of the main body 21, in which the first cylindrical portion 1b of the turn table 1 is fitted. The main body 21 also includes three of elastic claws 21b arranged at a radially outer part thereof. The elastic claws 21b are formed integral with the main body 21 and are spaced about the center axis J1 at approximately 120-degree angles.

Slits extending in the radial direction from the radially outer circumferential surface of the main body 21 are arranged circumferentially both ends of each of the elastic claws 21b. Radially outside ends of the elastic claws 21b slightly protrude in the radially outward direction from the other radially outer end surface of the main body 21. When the data storage disk is set on the motor, the chucking member 2 is fitted in the center opening of the data storage disk. Upon the insertion, an inner circumferential wall defining the center opening of the data storage disk engages with the elastic claws 21b, and then, radially outer circumferential surfaces of the elastic claws 21b are elastically deformed into the radially inward direction.

The chucking member 2 also includes three chucking-claw-insertion hole 21c arranged at a radially outer portion of the main body 21. The chucking-claw-insertion hole 21c are spaced about the center axis J1 at approximately 120 degree angles, and each of the chucking-claw-insertion hole 21c is arranged circumferentially between the adjacent elastic claws 21b. In other words, the elastic claws 21b and the chucking-claw-insertion hole 21c are alternately arranged in every approximately 60 degrees in the circumferential direction. The chucking claws 22 are arranged in the chucking-claw-insertion hole 21c in a radially movable manner such that radially outer portion of the chucking claws 22 radially outwardly protruding from the radially outer circumferential surface of the main body 21 is retractable into the main body 21. As illustrated in FIGS. 4B and 4C, the main body 21 further includes the concave portions 21d arranged radially inside of the chucking-claw-insertion holes 21c. In the concave portions 21d, the coil springs 23, elastic members pressing the chucking claws 22 in the radially outer direction are arranged in the concave portions 21d.

FIGS. 5A to 5C are views illustrating one of the chucking claws 22. In the following description of the chucking claws 22, the words such as circumferentially referred to the direction when the chucking claws 22 are arranged to the main body 21 as illustrated in FIG. 6.

Each of the chucking claws 22 includes a claw portion 22a which radially outwardly protrudes from the radially outer portion of the main body 21 when installed in the main body 21. Each of the chucking claws 22 also includes a set of engaging portions 22b arranged at circumferentially both-side ends of the claw portion 22a. In addition, each of the chucking claws 22 includes a convex portion 22c arranged at a portion circumferentially between the set of engaging portions 22b and radially inside of the claw portion 22a. The convex portion 22c of each of the chucking claws 22 comes in contact with a radially outside end of each of the coil springs 23.

As illustrated in FIG. 6, the chucking claws 22 and the coil springs 23 are arranged in the concave portions 21d formed in the main body 21 of the chucking member 2. The radially outer end of each of the coil springs 23 comes in contact with a radially inner surface of the claw portion 22a of each of the chucking claws 22 (i.e., a portion around the concave portion 22c). The radially inner end of each of the coil springs 23 comes in contact with a radially inner wall 21e defining a radially inner end of each of the concave portions 21d. Due to the bias force each of the coil springs 23 applied to each of the chucking claws 22, engaging surfaces 22d of each of the chucking claws 22, which are radially outer surfaces of the engaging portions 22b, are pressed against and come in contact with a radially outer wall 21f defining a radially outer end of each of the concave portions 21d. By contacting the engaging surfaces 22d and the radially outer wall 21f, the chucking claws 22 are not removed in the radially outward direction of the concave portions 21d. In addition, the chucking claws 22 are supported in a radially inwardly movable manner on applying force against the bias force of the coil springs 23 to the chucking claws 22.

As illustrated in FIGS. 1 and 4B, the diameter of the second cylindrical portion 1c of the turn table 1 (illustrated by broken lines in FIG. 4B) is substantially the same as a distance from the center axis J1 to a center of the radially inner wall 21e of the concave portions 21d. In other words, as illustrated in FIGS. 4C and 6, in the plain view, the radially inner wall 21e comes in contact with the second cylindrical portion 1c at the center portion of the radially inner wall 21e. Thus, as illustrated in FIGS. 1 and 4B, the radially inner end of each of the coil springs 23 comes in contact with the radially inner wall 21e of each of the concave portions 21d formed in the main body 21 of the chucking member 2 and the second cylindrical portion 1c of the turn table 1. In addition, as illustrated in FIG. 1, the axially upper side of the radially inner end of each of the coil springs 23 comes in contact with and is supported by the radially inner wall 21e, and the axially lower side of the radially inner end of each of the coil springs 23 comes in contact with and is supported by the second cylindrical portion 1c.

As illustrated in FIG. 1, the second cylindrical portion 1c coming in contact with the coil springs 23 is arranged radially outside of the shaft 8 and the sleeve 3, and a space radially inside of the second cylindrical portion is used for accommodating a part of the sleeve 3. By supporting the radially inner end of each of the coil springs 23 with the second cylindrical portion 1c arranged on the turn table 1, it is possible to maintain a space at radially inside of the second cylindrical portion 1c to make the axial lengths of the shaft 8 and the sleeve 3 longer. Through the configuration in which the axial length of the sleeve longer than that of the stator 4, it is possible to support the turn table 1 in a stably rotatable manner and to prolong the bearing life of the motor while reducing the axial length of the motor.

It should be noted, however, the configuration, in which the radially inner end of each of the coil springs 23 comes in contact with and is supported by the radially inner wall 21e of each of the concave portions 21d arranged in the chucking member 2 and the second cylindrical portion 1c of the turn table 1, makes manufacturing process of the motor complicated. In particular, in manufacturing of the motor according to the preferred embodiment of the present invention, the chucking member 2, in which the chucking claws 22 and the coil springs 23 are installed, should be attached to the turn table 1 such that the radially inner end of each of the coil springs 23 comes in contact with the second cylindrical portion 1c while paying great care that the coil springs 23 is not removed from the concave portions 21d.

According to a preferred embodiment of the present invention, a method of manufacturing a motor in which the assembly of the chucking-mechanism is facilitated. In the method of manufacturing the motor according to the preferred embodiment of the present invention, the chucking claws 22 are arranged in the concave portions 21d of the main body 21 of the chucking member 2, and then, the main body 21 of the chucking member 2 is attached to the first cylindrical portion 1b of the turn table 1. As illustrated in FIG. 1, the turn table 1 according to the preferred embodiment of the present invention includes three through holes 1d which are spaced about the center axis J1 at approximately 120-degree angles. The chucking member 2 is arranged on the turn table 1 so as to align the concave portions 21d and the through holes 1d. When the main body 21 of the chucking member 2 is adhered to the first cylindrical portion 1b of the turn table 1 with adhesive, the concave portions 21d and the through holes 1d are aligned prior to the adhesive is hardened. Then each of the coil springs 23 is inserted via each of the through holes 1d into a spring-housed space defined radially between each of the chucking claws 21e, and the radially inner wall 21e of each of the concave portions 21d and the second cylindrical portion 1c of the turn table 1.

Each of the coil springs 23 has a length in the radial direction longer than that of each of the through holes 1d and a diameter smaller than the width of each of the through holes 1d in the circumferential direction. However, when the coil springs 23 are compressed, each of the coil springs 23 has a length in the radial direction smaller than that of each of the through holes 1d. Thus, each of the coil springs 23 is inserted into the spring-housed space via each of the through holes 1d. Once each of the coil springs 23 is inserted into the spring-housed space, the radial length of each of the coil springs 23 is restored, and thus, the radially inner end of each of the coil springs 23 comes in contact with the radially inner wall 21e, and the radially outer end of each of the coil springs 23 comes in contact with the chucking claw 22. After the radial length of each of the coil springs 23 is restored in the spring-housed space, each of the coil springs 23 is not easily removed from the spring-housed space.

Meanwhile, each of the through holes is arranged in the spring housed space and circumferentially between the engaging portions 22d of each of chucking claws 22. In other words, the engaging portions 22d of each of chucking claws have circumferentially facing surfaces, and each of the coil springs 23 is arranged circumferentially between the circumferentially facing surfaces. Each of the through holes, through which the spring coil is inserted into the spring-housed space, is also arranged circumferentially between the engaging portions, facilitating the insertion of the coil springs in the spring-housed space.

Mechanism of Preventing Rotor from Being Removed from Stator

Figure 7A:
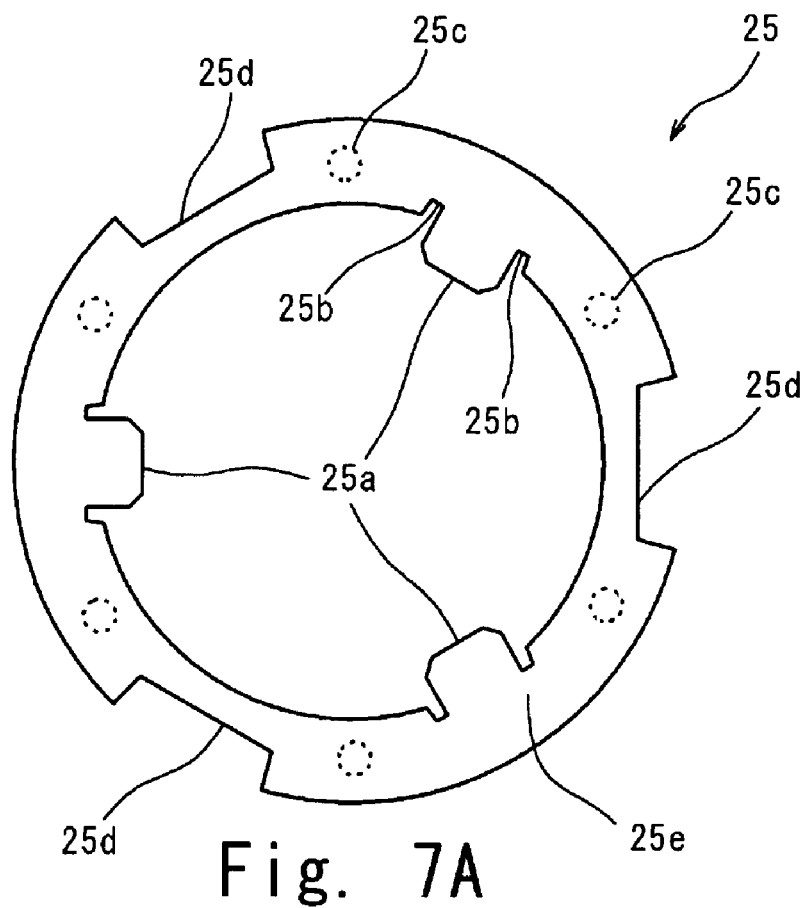
FIG. 7A is a top plan view illustrating a retaining member according to a preferred embodiment of the present invention.
Figure 7B:
FIG. 7B illustrates a cross section of the retaining member along the center axis of the motor.

With reference to FIGS. 1, 7A, and 7B, a retaining mechanism for preventing a rotor member including the turn table 1 and the shaft 8 from being removed in the axial direction from a stator member including the sleeve 3 and the bushing 6 will be described in detail.

As illustrated in FIG. 1, the bushing 6 includes a flange portion 6c radially outwardly extending from an axially upper end of the cylindrical portion 6a. In addition, a retaining plate 25 is arranged on an axially lower surface of the turn table 1. The retaining plate 25 having a substantially discoid shape engages with the flange portion 6c when the rotor member moves into an axially upper direction, preventing the rotor member from being removed from the stator member in the axial direction.

In the preferred embodiment of the present invention, the retaining plate 25 illustrated in FIGS. 7A and 7B is formed by pressing a stainless steel plate. As illustrated in FIG. 7A, the retaining plate 25 includes a circular body 25e having a substantially circular shape, and three of extending portions 25a which radially inwardly extend from an inner circumferential surface of the circular body 25e and are spaced about the center axis J1 at approximately 120-degree angles from each other. The extending portions 25a come in contact with the flange portion 6c of the bushing 6 when the rotor member axially upwardly moves, preventing the rotor member from being removed from the stator member.

The retaining plate 25 includes slits 25b, extending radially outwardly from the radially inner circumferential surface of the circular body 25e, are arranged circumferentially both ends of each of the extending portions 25a. With the slits 25b arranged circumferentially both sides of each of the extending portions 25a, the elasticity in the axial direction of the extending portions 25a increases. As illustrated in FIG. 1, the retaining plate 25 is attached to the turn table 1 and is arranged radially outward of the cylindrical portion 6b, and the radially inner ends of the extending portions 25a are arranged radially inward from a radially outer end of the flange portion 6c. In assembling the motor, when the rotor member is arranged on the stator member from axially upper side of the stator member, the retaining plate 25 comes in contact with the flange portion 6, making it difficult to combining the rotor member and the stator member. In the present preferred embodiment of the present invention, since the elasticity of the extending portions 25a is increased by providing the slits 25b, the rotor member is easily arranged on the stator member, facilitating the manufacturing of the motor.

As illustrated in FIG. 1, the flange portion 6c includes an inclining part at which the axially upper surface of the flange portion 6c axially downwardly inclining toward a radially outside direction. The flange portion 6c has an axially lower surface substantially perpendicular to the center axis J1. When the shaft 8 which is attached to the turn table 1 is inserted into the sleeve 3, the radially inner ends of the extending portions 25 of the retaining plate 25 firstly come in contact with the inclining part of the flange portion 6c of the bushing 6. Then, as the shaft 8 is inserted into the sleeve 3, the extending portions 25a are elastically deformed along the inclining part. By further inserting the shaft 8 into the sleeve 3, the extending portions 25a passes the flange portion 6c and arranged at axially lower side of the flange portion 6c such that the lower surface of the flange portion 6c axially faces the upper surfaces of the extending portions 25a.

Herewith, the flange portion 6c is arranged radially inside of the second cylindrical portion 1c, and axially between the first discoid portion of the turn table 1 and the retaining plate 25. Through the configuration, when the force removing the rotor member having the turn table 1 and the shaft 8 from the stator member in the axial direction is applied to the rotor member, the extending portions 25a of the retaining plate 25 come in contact with the flange portion 6c of the bushing 6, preventing the rotor member from being removed from the stator member. In addition, the flange portion 6c is arranged radially inside of the second cylindrical portion 6c, it is possible to reduce the axial height of the motor.

In the present preferred embodiment of the present invention, the retaining plate 25 is fixed to the lower surface of the turn table 1 by spot welding. As illustrated in FIG. 7A, six of the welding spots 25c at which the retaining plate 25 is welded to the turn table 1 are arranged on the circular body 25e of the retaining plate 25. In the present preferred embodiment of the present invention, the welding spots 25c are spaced about the center axis J1 at approximately 60-degree angles.

The retaining plate 25 is fixed to the turn table 1 such that the through holes 1d arranged in the turn table 1 are not occluded by the retaining plate 25. In the present preferred embodiment of the present invention, the retaining plate 25 includes three of indent portions 25d at which the outer periphery of the circular body is radially inwardly indented. The indent portions 25d are spaced about the center axis J1 at approximately 120 degree angles, and are aligned with the through holes 1d of the turn table 1 when the retaining plate 25 is fixed to the turn table 1. Then, the chucking member 2 with the chucking claws 22 is arranged on the turn table 1, and the coil springs 23 are inserted into the spring-housed space via the through holes 1d.

The extending portions 25a are spaced about the center axis J1 at approximately 120-degree angles from each other, the slits 25b are arranged circumferentially both side ends of each of the extending portions 25a, and the indent portions 25d are spaced about the center axis J1 at approximately 120-degree angles from each other. As illustrated in FIG. 7A, the extending portions 25a, the slits 25b, and the indent portions 25d are not aligned on line in the radial direction. In the preferred embodiment of the present invention, the retaining plate 25 having the configuration described above is formed by press working. By virtue of the configuration in which the extending portions 25a, the slits 25b, and the indent portions 25d are not aligned, the strength of the retaining plate 25 is preferably maintained, preventing the deformation of the circular body 25e of the retaining plate 25 during the press working process.

Although exemplary preferred embodiments of the present invention have been explained above, the present invention is not limited to the above. The present invention can be modified in various ways.

Figure 8A:
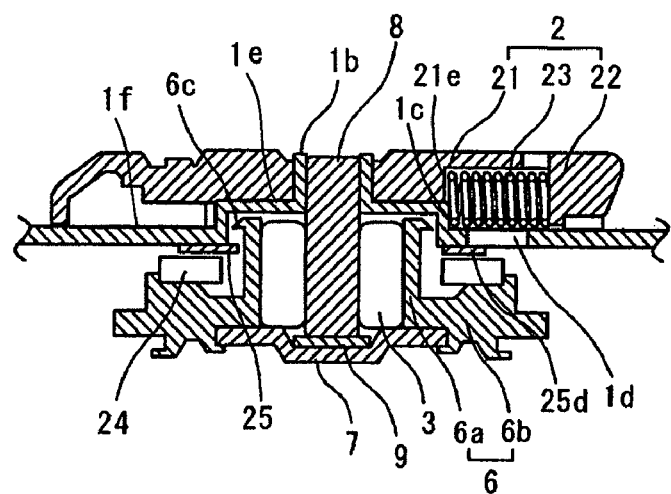
FIG. 8A illustrates a cross section of a motor along a center axis thereof according to another preferred embodiment of the present invention.

In the preferred embodiment of the present invention described above, the radially inner end of each of the coil springs 23 is supported by the radially inner wall 21e of the concave portion 21d and the second cylindrical portion 1c of the turn table 1. It should be noted, however, the radially inner end of the coil springs 23 may be supported by the radially inner wall 21e alone, as illustrated in FIG. 8A. In this case, it is preferable that the radially inner wall 21e extends in the axial direction to support the radially inner end of each of the coil spring 23. Thus, the radially inner wall 21e may be arranged radially outward of the second cylindrical portion 1c of the turn table 1 and extends in the axial direction to support the whole portion of the radially inner end of each of the spring coil 23. Specifically, as illustrated in FIG. 8C, the radially inner wall 21e may extend in the axial direction such that the axial length of the radially inner wall 21e is greater than that of the spring coil 23.

Figure 8B:
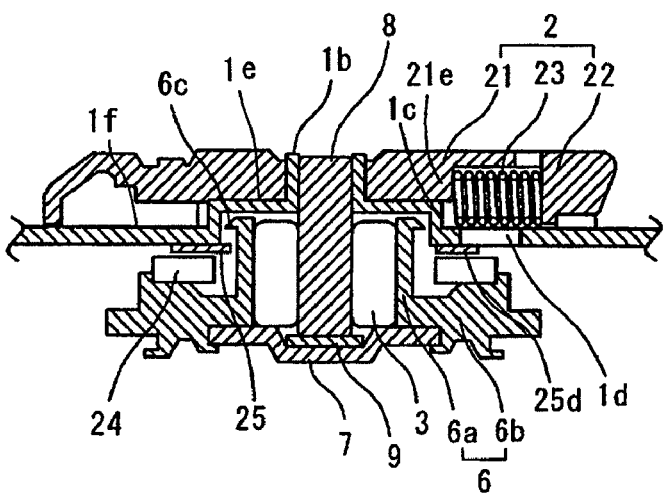
FIG. 8B illustrates a cross section of a motor along a center axis thereof according to yet another preferred embodiment of the present invention.
Figure 8C:
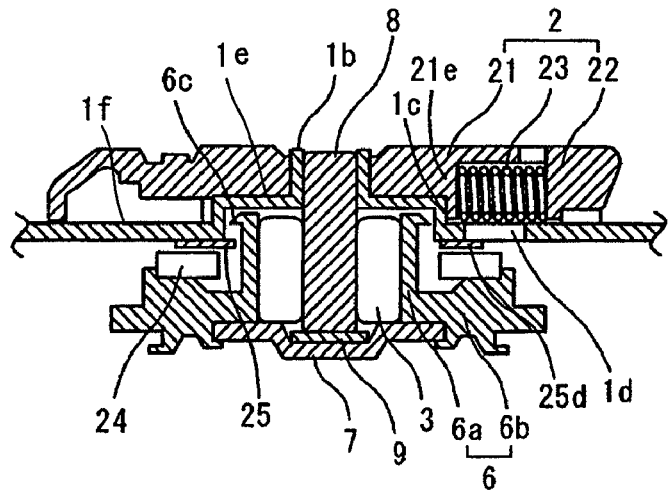
FIG. 8C illustrates a cross section of a motor along a center axis thereof according to yet another preferred embodiment of the present invention.

Meanwhile, as illustrated in FIG. 8B, the radially inner end of each of the coil springs 23 may be supported by the second cylindrical portion 1c of the turn table 1 alone. It should be noted, however, radially inner end of each of the coil springs 23 may be supported by the radially inner wall 21e when the high accuracy is required for the motor.

What is claimed is:

1. A chucking mechanism supporting a data storage disk having a center opening in a detachable manner, comprising:
   a turn table rotatable about a center axis, the turn table includes,
      a first cylindrical portion axially extending,
      a first discoid portion radially outwardly extending from the first cylindrical portion,
      a second cylindrical portion axially downwardly extending from a radially outside end of the first discoid portion, and
      a second discoid portion radially outwardly extending from the second cylindrical portion, on which the data storage disk is arranged; and
   a chucking member centered on the center axis and arranged on the turn table, the chucking member includes,
      a main body having an inner circumferential surface defining a center bore in which the first cylindrical portion of the turn table is fitted, an outer circumferential surface which is to radially face a radially inner surface of the data storage disk defining the center opening, and a radially inner wall arranged radially between the inner circumferential surface and the outer circumferential surface,
      a plurality of chucking claws supported in the main body in a radially movable manner, having radial tip ends arranged radially outside of the outer circumferential surface of the main body,
      a plurality of elastic members arranged radially between the radially inner wall of the main body and the plurality of chucking claws, and applying bias force radially outwardly pressing the chucking claws,
   wherein each of the elastic members comes in contact with at least one of the radially inner wall and the second cylindrical portion, and the radially inner wall and the second cylindrical portion are arranged at positions close or substantially the same to each other in the radial direction.

2. The chucking mechanism as set forth in claim 1, wherein an axially upper end of the second cylindrical portion is arranged axially lower than an axially upper end of the elastic member.

3. The chucking mechanism as set forth in claim 1, wherein an axial height of the radially inner wall of the main body is greater than that of the elastic member.

4. The chucking mechanism as set forth in claim 1, wherein the second discoid portion of the turn table includes a plurality of through holes axially penetrating the second discoid portion, wherein the through holes are arranged axially below the elastic members.

5. The chucking mechanism as set forth in claim 4, wherein the elastic members are coil springs which are compressible in the radial direction.

6. The chucking mechanism as set forth in claim 5, wherein a length of each of the through holes in a circumferential direction is greater than a length of each of the coil springs in the circumferential direction.

7. The chucking mechanism as set forth in claim 6, wherein a length of each of the through holes in the radial direction is smaller than a length of each of the coil springs in the radial direction.

8. The chucking mechanism as set forth in claim 5, wherein a length of each of the through holes in the radial direction is smaller than a length of each of the elastic member in the radial direction.

9. The chucking mechanism as set forth in claim 5,
   wherein each of the plurality of chucking claws includes a claw portion to come in contact with the data storage disk and engaging portions arranged both circumferential ends of the claw portions,
   a part of the claw portion is arranged radially outside of the radially outer circumferential surface of the main body,
   the engaging portions come in contact with the main body to restrict a movement of each of the chucking claws in the radial direction.

10. The chucking mechanism as set forth in claim 9, wherein the engaging portions arranged on both circumferential ends of the claw portions have circumferentially inner surfaces circumferentially facing to each other, wherein each of the through holes is arranged circumferentially between the inner surfaces when seen along the center axis.

11. A motor comprising:
   a shaft arranged coaxially with a center axis;
   a turn table rotatable about the center axis, the turn table includes,
      a first cylindrical portion axially extending,
      a first discoid portion radially outwardly extending from the first cylindrical portion,
      a second cylindrical portion axially downwardly extending from a radially outside end of the first discoid portion, and
      a second discoid portion radially outwardly extending from the second cylindrical portion, on which a data storage disk is arranged;
   a rotor magnet attached to the turn table;
   a stator facing the rotor magnet via a gap defined therebetween;
   a sleeve having a substantially cylindrical shape and supporting the shaft in a rotatable manner; and
   a bushing having a substantially cylindrical shape in which the sleeve is arranged;
   wherein the bushing includes a flange portion radially outwardly extending from an axially upper end of the bushing, wherein an inner diameter of the second cylindrical portion is greater than a radial length of the flange portion, wherein a retaining plate is arranged on an axially lower surface of the second discoid portion of the turn table, and wherein the retaining plate includes an extending portion arranged axially lower than the flange portion and having a radially inner end arranged radially inner from a radially outer end of the flange portion.

12. The motor as set forth in claim 11, wherein an axially upper end of the sleeve is arranged axially lower than an axially upper end of the bushing.

13. The motor as set forth in claim 11, wherein the retaining plate has a circular body having a substantially annular shape, a plurality of extending portions radially inwardly extending from the circular body, and a plurality of slits radially outwardly extending from a radially inner surface of the circumferential body and arranged both circumferential side ends of each of the extending portion.

14. The motor as set forth in claim 11, further comprising a chucking member centered on the center axis and arranged on the turn table, the chucking member includes, a main body having an inner circumferential surface defining a center bore in which the first cylindrical portion of the turn table is fitted, an outer circumferential surface which is to radially face an radially inner surface of the data storage disk defining the center opening, and a radially inner wall arranged radially between the inner circumferential surface and the outer circumferential surface, a plurality of chucking claws supported in the main body in a radially movable manner, having radial tip ends arranged radially outside of the outer circumferential surface of the main body, a plurality of elastic members arranged radially between the radially inner wall of the main body and the plurality of chucking claws and applying bias force pressing the chucking claws in the radially outer direction, wherein each of the elastic member comes in contact with at least one of the second cylindrical portion and the radially inner wall of the main body, and the second discoid portion of the turn table includes a plurality of through holes arranged at positions radially inner from a outer circumferential surface of the main body of the chucking member and radially outer from the second cylindrical portion of the turn table.

15. The motor as set forth in claim 14, wherein the elastic members are a plurality of coil springs, and the through holes are arranged axially below of positions at which the elastic members are to be arranged.

16. The motor as set forth in claim 15, wherein a length of each of the through holes in the radial direction is smaller than a length of each of the coil springs in the radial direction.

17. The motor as set forth in claim 15, wherein a length of each of the through holes in a circumferential direction is greater than a length of each of the coil springs in the circumferential direction.

18. The motor as set forth in claim 17, wherein a length of each of the through holes in the radial direction is smaller than a length of each of the coil springs in the radial direction.

19. The motor as set forth in claim 14, wherein the retaining plate includes a circular body having a substantially annular shape and indent portions at which a radially outer surface of the circular body is radially inwardly indented, the retaining plate is attached to the turn table while the indent portions are aligned with the through holes such that a part of the through hole are not covered with the circular body of the retaining plate.

20. The motor as set forth in claim 14, wherein the main body of the chucking member further includes a radially inner wall arranged radially between the inner circumferential surface and the outer circumferential surface, each of the elastic members comes in contact with at least one of the radially inner wall and the second cylindrical portion, and the radially inner wall and the second cylindrical portion are arranged at positions close or substantially the same to each other in a radial direction.

21. The motor as set forth in claim 20, wherein the first discoid portion of the turn table is arranged axially between an axially upper end and an axially lower end of the elastic member.

22. The motor as set forth in claim 20, wherein an axial height of the radially inner wall of the main body is greater than that of the elastic member.

23. A chucking mechanism supporting a data storage disk having a center opening in a detachable manner, comprising:

a turn table rotatable about a center axis, the turn table includes, a first cylindrical portion axially extending, a first discoid portion radially outwardly extending from the first cylindrical portion, a second cylindrical portion axially downwardly extending from a radially outside end of the first discoid portion, and a second discoid portion radially outwardly extending from the second cylindrical portion, on which the data storage disk is arranged, and a plurality of through holes axially penetrating the second discoid portion, and arranged at a position radially inner from a radially outer surface of the main body of the chucking member and radially outer from the second cylindrical portion of the turn table; and a chucking member centered on the center axis and arranged to the turn table, the chucking member includes, a main body having an inner circumferential surface defining a center bore in which the first cylindrical portion of the turn table is fitted and an outer circumferential surface which is to radially face a radially inner surface of the data storage disk defining the center opening, a plurality of chucking claws supported in the main body in a radially movable manner, and having radial tip ends arranged radially outside of the outer circumferential surface of the main body, and a plurality of coil springs arranged radially between the radially inner wall of the main body and the plurality of chucking claws, and applying bias force pressing the chucking claws in the radially outer direction, wherein the through holes are arranged axially below the coil springs.

24. The chucking mechanism as set forth in claim 23, wherein a length of each of the through holes in a circumferential direction is greater than a length of each of the coil springs in the circumferential direction.

25. The chucking mechanism as set forth in claim 24, wherein a length of each of the through holes in the radial direction is smaller than a length of each of the coil springs in the radial direction.

26. The chucking mechanism as set forth in claim 23, wherein a length of each of the through holes in the radial direction is smaller than a length of each of the coil springs in the radial direction.

27. A method of manufacturing a chucking mechanism supporting a data storage disk having a center opening in a detachable manner, the chucking mechanism includes a chucking member and a turn table rotatable about a center axis, the turn table includes,
 a first cylindrical portion axially extending,
 a first discoid portion radially outwardly extending from the first cylindrical portion,
 a second cylindrical portion axially downwardly extending from a radially outside end of the first discoid portion,
 a second discoid portion radially outwardly extending from the second cylindrical portion, on which the data storage disk is arranged, and
 a plurality of through holes axially penetrating the second discoid portion, and arranged at positions radially inner from a radially outer surface of the main body of the chucking member and radially outer from the second cylindrical portion of the turn table; and
 a chucking member centered on the center axis and arranged on the turn table, including, the chucking member includes,
  a main body having an inner circumferential surface defining a center bore in which the first cylindrical portion of the turn table is fitted, an outer circumferential surface which is to radially face a radially inner surface of the data storage disk defining the center opening, and a radially inner wall arranged radially between the inner circumferential surface and the outer circumferential surface,
  a plurality of chucking claws supported in the main body in a radially movable manner, having radially tip ends arranged radially outside of the outer circumferential surface of the main body,
  a plurality of coil springs arranged radially between the radially inner wall of the main body and the plurality of chucking claws and applying bias force pressing the chucking claws in the radially outer direction,
 wherein the through holes are arranged axially below the coil springs, the method comprising steps of:
 a) attaching the plurality of chucking claws to the main body of the chucking member;
 b) fixing the main body to which the chucking claws is attached to the turn table; and
 c) arranging the plurality of coil springs between the main body and the plurality of chucking claws via the through holes arranged in the turn table.

28. The method of manufacturing the chucking mechanism as set forth in claim 27, wherein the coil springs are arranged between the main body and the plurality of chucking claws via the through holes while the coil springs are compressed in the radial direction in the step c).

29. The method of manufacturing the chucking mechanism as set forth in claim 28, further comprising a step of attaching a retaining plate to an axially lower surface of the turn table, performed prior to the step b).

30. A motor comprising:
 a shaft arranged coaxially with a center axis;
 a turn table rotatable about the center axis, the turn table includes,
  an inner cylindrical portion axially extending,
  a first discoid portion radially outwardly extending from the inner cylindrical portion,
  a middle cylindrical portion axially downwardly extending from a radially outside end of the first discoid portion, and
  a second discoid portion radially outwardly extending from the middle cylindrical portion, on which a data storage disk is arranged;
 a rotor magnet attached to the turn table;
 a stator facing the rotor magnet via a gap;
 a sleeve having a substantially cylindrical shape and supporting the shaft in a rotatable manner; and
 a bushing having a substantially cylindrical shape in which the sleeve is arranged;
 wherein the bushing includes a flange portion radially outwardly extending from an axially upper end of the bushing,
 wherein an inner diameter of the middle cylindrical portion is greater than a radial length of the flange portion such that the flange portion is accommodated inside the middle cylindrical portion,
 wherein a retaining plate is arranged on an axially lower surface of the second discoid portion of the turn table, and
 wherein the retaining plate includes an extending portion arranged axially lower than the flange portion and having a radially inner end arranged radially inner from a radially outer end of the flange portion.

31. The motor as set forth in claim 30, wherein an axially upper end of the sleeve is arranged axially lower than an axially upper end of the bushing.

32. The motor as set forth in claim 30, wherein the retaining plate has a circular body having a substantially annular shape, a plurality of extending portions radially inwardly extending from the circular body, and a plurality of slits radially outwardly extending from a radially inner surface of the circumferential body and arranged both circumferential side ends of each of the extending portion.

33. The motor as set forth in claim 30, further comprising a chucking member centered on the center axis and arranged on the turn table, the chucking member includes,
 a main body having an inner circumferential surface defining a center bore in which the inner cylindrical portion of the turn table is fitted, an outer circumferential surface which is to radially face an radially inner surface of the data storage disk defining the center opening, and a radially inner wall arranged radially between the inner circumferential surface and the outer circumferential surface,
 a plurality of chucking claws supported in the main body in a radially movable manner, having radial tip ends arranged radially outside of the outer circumferential surface of the main body,
 a plurality of elastic members arranged radially between the radially inner wall of the main body and the plurality of chucking claws and applying bias force pressing the chucking claws in the radially outer direction,
 wherein each of the elastic member comes in contact with at least one of the middle cylindrical portion and the radially inner wall of the main body, and the second discoid portion of the turn table includes a plurality of through holes arranged at positions radially inner from a outer circumferential surface of the main body of the chucking member and radially outer from the middle cylindrical portion of the turn table.

34. The motor as set forth in claim 33, wherein the elastic members are a plurality of coil springs, and the through holes are arranged axially below of positions at which the elastic members are to be arranged.

35. The motor as set forth in claim 34, wherein a length of each of the through holes in the radial direction is smaller than a length of each of the coil springs in the radial direction.

36. The motor as set forth in claim 34, wherein a length of each of the through holes in a circumferential direction is greater than a length of each of the coil springs in the circumferential direction.

37. The motor as set forth in claim 36, wherein a length of each of the through holes in the radial direction is smaller than a length of each of the coil springs in the radial direction.

38. The motor as set forth in claim 33, wherein the retaining plate includes a circular body having a substantially annular shape and indent portions at which a radially outer surface of the circular body is radially inwardly indented, the retaining plate is attached to the turn table while the indent portions are aligned with the through holes such that a part of the through hole are not covered with the circular body of the retaining plate.

39. The motor as set forth in claim 33, wherein the main body of the chucking member further includes a radially inner wall arranged radially between the inner circumferential surface and the outer circumferential surface, each of the elastic members comes in contact with at least one of the radially inner wall and the middle cylindrical portion, and the radially inner wall and the middle cylindrical portion are arranged at positions close or substantially the same to each other in a radial direction.

40. The motor as set forth in claim 39, wherein the first discoid portion of the turn table is arranged axially between an axially upper end and an axially lower end of the elastic member.

41. The motor as set forth in claim 39, wherein an axial height of the radially inner wall of the main body is greater than that of the elastic member.

* * * * *